United States Patent
Prinz et al.

(10) Patent No.: US 7,444,856 B2
(45) Date of Patent: Nov. 4, 2008

(54) SENSORS FOR ELECTROCHEMICAL, ELECTRICAL OR TOPOGRAPHICAL ANALYSIS

(75) Inventors: Friedrich B. Prinz, Woodside, CA (US); Ye Tao, Stanford, CA (US); Rainer J. Fasching, Mill Valley, CA (US); Ralph S. Greco, Stanford, CA (US); Kyle Hammerick, Mountain View, CA (US); Robert Lane Smith, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 31 days.

(21) Appl. No.: 11/233,677

(22) Filed: Sep. 22, 2005

(65) Prior Publication Data
US 2006/0213259 A1    Sep. 28, 2006

Related U.S. Application Data

(60) Provisional application No. 60/613,173, filed on Sep. 23, 2004.

(51) Int. Cl.
*G12B 21/02* (2006.01)
*G12B 21/06* (2006.01)
*G01N 13/10* (2006.01)
*G01N 13/24* (2006.01)
*B82B 1/00* (2006.01)

(52) U.S. Cl. ............ 73/105; 324/715; 422/82.01; 436/63; 977/860; 977/869; 977/875

(58) Field of Classification Search ........... 73/104–105, 73/866.5; 422/82.01; 324/715; 436/63; 977/853, 860, 869, 878, 874–875, 880–881
See application file for complete search history.

(56) References Cited

U.S. PATENT DOCUMENTS

| 4,628,933 | A |   | 12/1986 | Michelson ............ 607/53 |
|---|---|---|---|---|
| 5,299,572 | A |   | 4/1994 | Chen et al. ............ 600/395 |
| 5,357,787 | A | * | 10/1994 | Kado et al. ............ 73/105 |
| 5,388,577 | A |   | 2/1995 | Hubbard ............ 600/377 |
| 5,481,528 | A | * | 1/1996 | Eguchi et al. ............ 369/126 |
| 5,821,410 | A | * | 10/1998 | Xiang et al. ............ 73/105 |
| 5,844,251 | A | * | 12/1998 | MacDonald et al. .... 977/878 X |

(Continued)

OTHER PUBLICATIONS

Y. Tao, et al. "Ultra-sharp High-aspect-ratio probe Array for SECM and AFM analysis", Proceedings of SPIE vol. 5389, Smart Structures and Materials 2004: Smart Electronics, MEMS, BioMEMS, and Nanotechnology, Vijay K. Varadan, Editor, Jul. 2004, pp. 431-442.

(Continued)

*Primary Examiner*—Thomas P Noland
(74) *Attorney, Agent, or Firm*—Lumen Patent Firm, Inc.

(57) ABSTRACT

Sensors and systems for electrical, electrochemical, or topographical analysis, as well as methods of fabricating these sensors are provided. The sensors include a cantilever and one or more probes, each of which has an electrode at its tip. The tips of the probes are sharp, with a radius of curvature of less than about 50 nm. In addition, the probes have a high aspect ratio of more than about 19:1. The sensors are suitable for both Atomic Force Microscopy and Scanning Electrochemical Microscopy.

15 Claims, 10 Drawing Sheets

U.S. PATENT DOCUMENTS

| | | | | |
|---|---|---|---|---|
| 6,066,265 | A * | 5/2000 | Galvin et al. | 216/2 |
| 6,358,426 | B1 * | 3/2002 | Muramatsu et al. | 73/105 X |
| 6,504,152 | B2 * | 1/2003 | Hantschel et al. | 73/105 X |
| 6,640,433 | B1 * | 11/2003 | Kuroda et al. | 977/856 X |
| 6,682,648 | B1 | 1/2004 | MacPhee et al. | 205/777.5 |
| 6,682,936 | B2 | 1/2004 | Kovacs | 436/149 |
| 6,726,880 | B1 | 4/2004 | Ackley et al. | 422/68.1 |
| 6,894,272 | B2 | 5/2005 | Kranz et al. | 250/234 |
| 2002/0021139 | A1 * | 2/2002 | Jackson | 324/762 |
| 2002/0146714 | A1 * | 10/2002 | Lieber et al. | 435/6 |
| 2004/0084737 | A1 * | 5/2004 | Kitazawa et al. | 257/414 |
| 2005/0073323 | A1 * | 4/2005 | Kohno et al. | 324/662 |
| 2005/0242283 | A1 * | 11/2005 | Hasegawa et al. | 250/310 |

OTHER PUBLICATIONS

R.J. Fasching, et al. "A Pencil Probe System for Electrochemical Analysis and Modification in Nanometer Dimension", Proc. SPIE 5116, Smart Sensors, Actuators, and MEMS;, Jung-Chih Chiao, Vijay K. Varadan, Carles Caneé; Eds. Apr. 2003, 128-135.

R. Fasching, Y. Tao, F. Prinz, "Fabrication of and Electrochemical Tip-Probe System Embedded in SiNx-Cantilevers for Simultaneous SECM and AFM Analysis", Proc. SPIE 5342, Micromachining and Microfabrication Process Technology IX, Mary A. Maher, Jerome F. Jakubczak; Eds. Dec. 2003 53-64.

R. Fasching, Y. Tao, S.J. Bai, K. Hammerick, L. Smith, R. Greco, F. Prinz, "Next Generation Sensors for Measuring Ionic Flux in Live Cells", in Nanoscale Biology in Biological Systems, R. Greco, F. Prinz, and L. Smith eds., CRC Press, Dec. 2004 pp. 1-21.

R. Fasching, Y. Tao, F. Prinz "Cantilever Tip-Probe Arrays for Simultaneous SECM and AFM Analysis", Sensors and Actuators B: Chemical, vol. 108 Jul. 2005 964-972 (herein as pp. 1-33).

Dobson PS, Weaver JM, Holder MN, Unwin PR, Macpherson JV. Characterization of batch-microfabricated scanning electrochemical-atomic force microscopy probes. Anal Chem. Jan. 15, 2005;77(2):424-34.

Hirata Y, Yabuki S, Mizutani F. Application of integrated SECM ultra-micro-electrode and AFM force probe to biosensor surfaces. Bioelectrochemistry. Jun. 2004;63(1-2):217-24.

Macpherson JV, Unwin PR. Combined scanning electrochemical-atomic force microscopy. Anal Chem. Jan. 15, 2000;72(2):276-85.

David P. Burt, Neil R. Wilson, John M. R. Weaver, Phillip S. Dobson, and Julie V. Macpherson Nanowire Probes for High Resolution Combined Scanning Electrochemical Microscopy—Atomic Force Microscopy Nano Lett.;5(4) pp. 639-643 Mar. 2005.

* cited by examiner

A

B

C

A

B

C

SENSORS FOR ELECTROCHEMICAL, ELECTRICAL OR TOPOGRAPHICAL ANALYSIS

CROSS-REFERENCE TO RELATED APPLICATIONS

This application claims priority from U.S. Provisional Patent Application No. 60/613,173, filed Sep. 23, 2004, which is incorporated herein by reference.

FIELD OF THE INVENTION the present invention relates generally to sensors. More particularly, the present invention Relates to sensors for electrical, electrochemical and topographical analysis.

BACKGROUND

Scanning Electrochemical Microscopy (SECM), one of the major developments in the field of electrochemistry in the past decade, has been shown to be a promising analytical tool for localized studies of surface reactions and their kinetics. In addition, SECM has proved promising for imaging at a nano-scale level. The use of SECM has been demonstrated in a wide range of applications, such as resolving fast heterogeneous kinetics at various material interfaces and imaging of biological molecules. In addition, SECM has been applied in fabrication processes. Studies have shown that metal deposition, metal and semiconductor etching, polymer formation, and other surface modifications with sub micron resolution are feasible when SECM is used.

The achievable localization or spatial resolution of SECM for both analytical and fabrication purposes strongly depends on the shape and size of the electrochemical electrode used. Ultra Micro Electrodes (UME), which are tip probes carrying sub-micron electrodes, are required to obtain resolution at a nanometer scale. Various manufacturing approaches for UMEs have been investigated, ranging from isolation of etched metal wires or Scanning Tunneling Electron Microscopy (STEM) tips for single electrode systems to patch fabrication strategies for electrode array systems.

A combination of SECM with other Scanning Probe Microscopy (SPM) techniques, such as Atomic Force Microscopy (AFM) or Scanning Nearfield Microscopy (SNOM), is highly desirable to obtain complementary surface information simultaneously. In particular, a combination of SECM with the AFM technique can overcome current limitations of SECM, such as uncertainties in distance control of tip to sample. It can additionally allow experiments to study electrochemically initiated changes of topography with simultaneous SECM and AFM.

A crucial component of a combined SECM/AFM system is a specialized probe system, which must be composed of a micro-mechanical bending structure necessary for the AFM mode and an electrochemical UME-tip required for high performance SECM. Several strategies for fabrication of such a probe have been reported.

One strategy is to use modifications of metal wires. An example of this strategy is based on the attachment of a piezo element to the shaft of a conventional UME wire electrode for dithering. The lateral oscillation is measured using an optical laser diffraction measuring system. This type of probe has rarely been used for SECM studies due to the instability of the optical detection system when the tip is largely immersed in a solution. Another example of this strategy is based on shaping cantilever-type SECM tip probes out of a metal wire. Similar to the production of conventional SECM probes, a wire is etched to a pointed tip. Then the wire tip is mechanically bent and flattened to form a cantilever structure. An electrophoretic paint is used as an isolation layer. The disadvantages of this solution include low AFM resolution and mechanical instability of the tip during AFM analysis. A third example of this strategy is to glue a conventional SECM wire-tip to a tuning fork. This way, a commercial NSOM instrument can be used to image surfaces in SECM mode. Disadvantages of this approach include no topographical information and limited spatial resolution.

Another strategy is based on modification of already fabricated AFM cantilever tip probes. The tip and cantilever are metallized to accomplish a conducting bath to the tip. Then all conductive surfaces are insulated except the top area of the tip. A trade off is poor SECM performance mainly because of difficulties with simultaneously providing good tip insulation and useful tip configuration. A similar concept uses FIB technologies to modify AFM cantilever tip probes. Although these efforts resulted in functional tip structures and combined AFM and SECM images were reported, performance issues related to tip sharpness and size of the electrochemical electrode have remained.

The common disadvantage for all of the above described fabrication technologies is a single probe production scheme, which limits miniaturization possibilities and fabrication of multi-probe systems. Accordingly, there is a need in the art to develop methods that allow for production of nano-scale, multi-probe sensors suitable for AFM and SECM analysis.

SUMMARY OF THE INVENTION

The present invention provides a method of fabricating sensors suitable for electrical, electrochemical, and topographical analysis. The method exploits micro- and nano-fabrication technologies to make sensors with one or more sharp, high-aspect ratio electrochemical tip probes embedded in a cantilever. The sensors are suitable for both AFM and SECM analyses.

The method starts with shaping one or more High-Aspect Ratio Silicon tips in a silicon wafer. Next, the tips are embedded in a uniform layer of silicon nitride. This silicon nitride layer forms the basis for the cantilever. The silicon nitride layer is then coated with a non-uniform coating of photoresist. This photoresist is then removed from a top section of the tips and electrodes are patterned on this section. The electrodes are then passivated with an isolation layer. After electrode passivation, a cantilever is patterned in the silicon nitride layer and the top section of the tips is etched to generate an ultra-micro electrode. Finally, the cantilever with one or more tips is released from the silicon wafer. In a preferred embodiment, the method also includes the steps of embedding the tips with a layer of silicon dioxide and forming electrical through-wafer interconnection structures in the silicon wafer. Preferably, the HARS tips are fabricated with an aspect ratio of greater than about 19:1, with an initial diameter of less than about 2 µm, and with a distance of less than about 10 µm between adjacent tips. Also preferably, the etching step results in a tip with a radius of curvature of less than about 50 nm. The number of tips on the cantilever may be any number, but is preferably between 2 and 2000. Preferably, the silicon nitride layer is less than about 500 nm, resulting in a cantilever with a thickness of less than about 500 nm.

The invention also provides sensors for electrical, electrochemical and topographical analysis made with the above methods as well as systems for electrical, electrochemical and topographical analysis using the sensors.

BRIEF DESCRIPTION OF THE FIGURES

The present invention together with its objectives and advantages will be understood by reading the following description in conjunction with the drawings, in which.

DETAILED DESCRIPTION OF THE INVENTION

Figure 1:
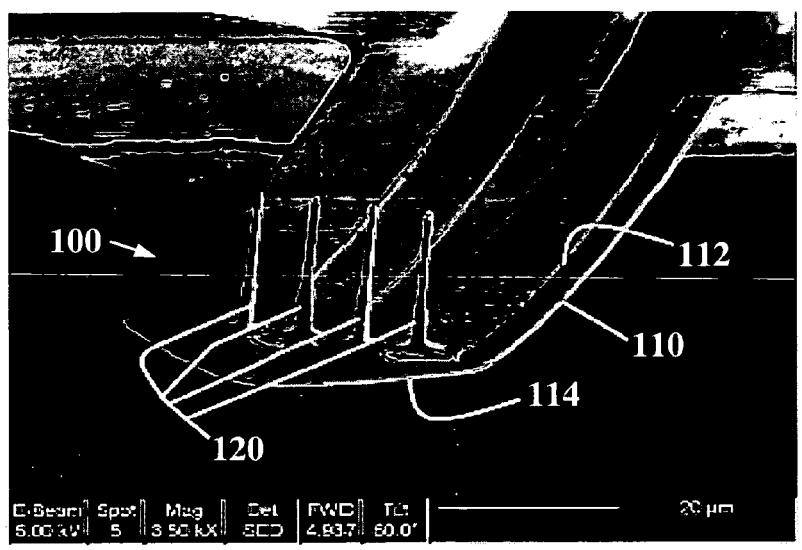
FIG. 1 shows examples of sensors for electrical, electrochemical or topographical analysis according to the present invention.
Figure 1:
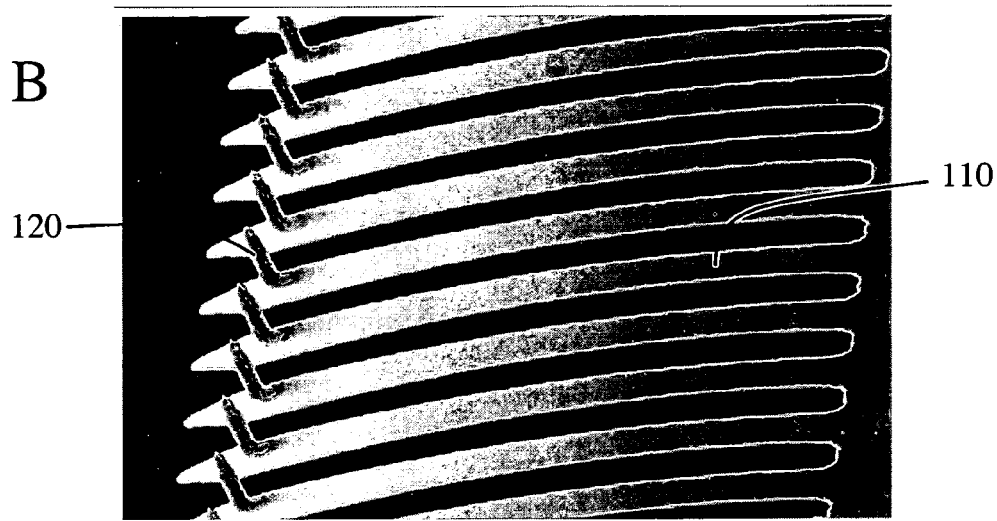
Figure 1:
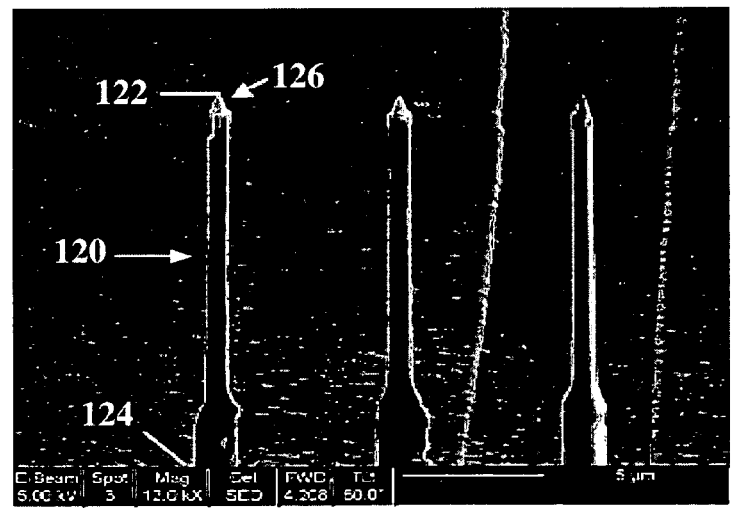

The present invention provides sensors for electrical, electrochemical and topographical analysis. In one embodiment, the sensors are used for simultaneous or sequential Scanning Electrochemical Microscopy (SECM) and Atomic Force Microscopy (AFM) analysis. In one aspect of this embodiment, the sensors are used to study live cells, biological tissue, or other electrochemical systems. Examples of sensors according to the invention are shown in FIG. 1. As can be seen in FIG. 1A, each sensor 100 includes a cantilever 110, with a top surface 112 and a bottom surface 114, and one or more probes 120 attached to top surface 112. In a preferred embodiment of the invention, the probes are spaced less than about 10 µm apart on the cantilever. In another preferred embodiment, the number of probes 120 on cantilever 110 ranges from about 2 to about 2000. In another embodiment of the invention, shown in FIG. 1B, cantilever 110 is cut into longitudinal sections, with each section containing a probe 120.

A close-up view of probes 120 is shown in FIG. 1C. As can be seen from FIG. 1C, each probe 120 has a first end 122 and a second end 124. The first end 122 of probe 120 includes an electrode 126. The second end 124 is attached to the top surface 112 of cantilever 110. In a preferred embodiment, the first end 122 of probe 120 has a radius of curvature of less than about 50 nm, and a ratio of the diameter of the second end 124 to the distance between first end 122 and second end 124 is at least 19:1. In other words, the probes preferably have an aspect ratio of at least 19:1. In a preferred embodiment, the cantilever 110 has a thickness of less than about 500 nm. In a particularly preferred embodiment, the cantilever 110 has a thickness of less than about 300 nm. A very thin cantilever makes the sensor particularly well suited for scanning soft, biological membranes and cells.

Fabrication Of Sensors

Figure 2:
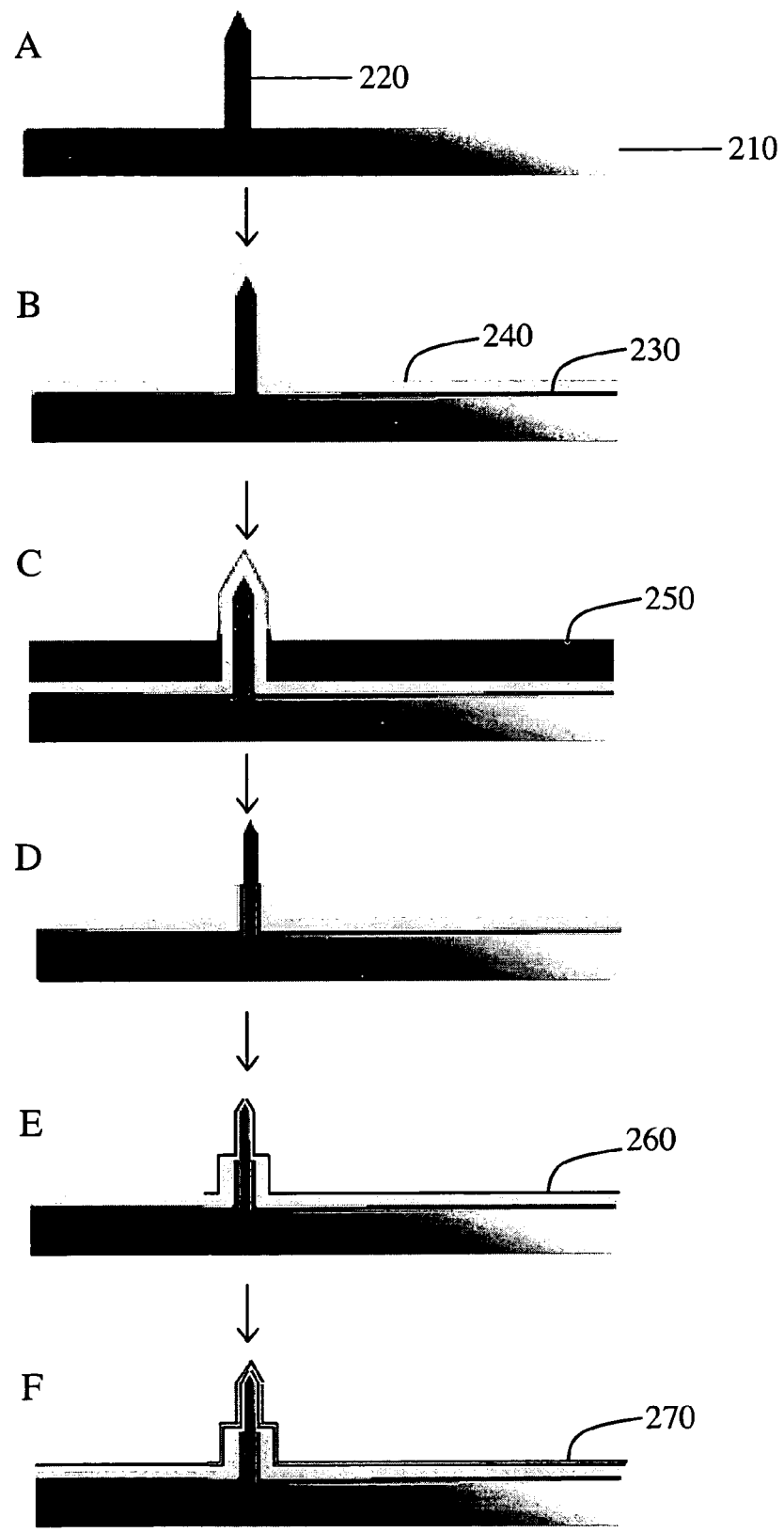
FIGS. 2-3 show a method of fabricating a sensor for electrical, electrochemical or topographical analysis according to the present invention.
Figure 3:
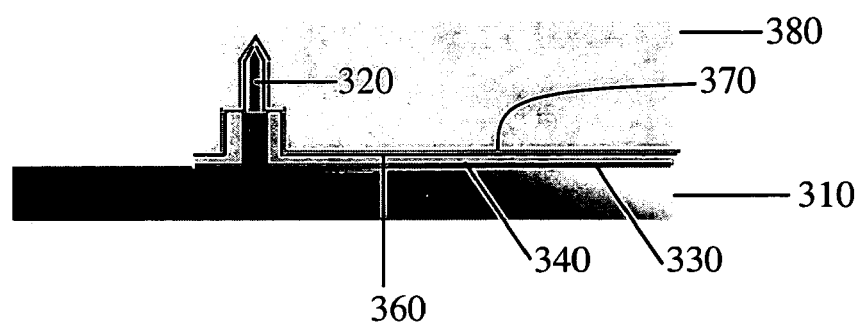
Figure 3:
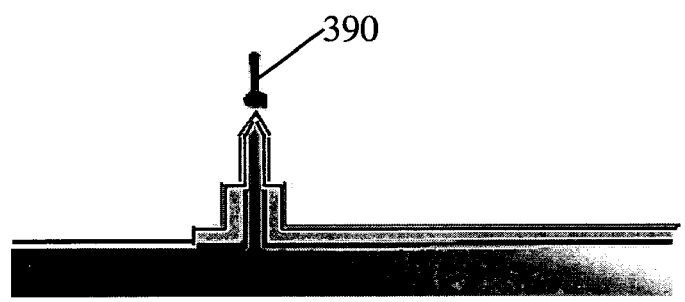
Figure 3:
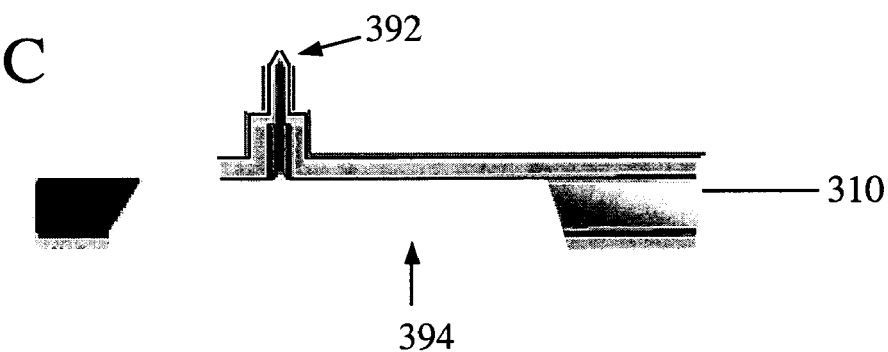

The fabrication process, illustrated in FIGS. 2 and 3, typically starts with a silicon wafer 210. In a preferred embodiment, an about four-inch silicon wafer is used. Standard silicon wafers or wafers having electrical through-wafer interconnections may be used according to the invention. The latter are typically formed by creating openings in a double-sided polished wafer, using a high-density inductively coupled plasma etch technique. In one aspect of this embodiment, via structures with a diameter of about 20 µm are formed through a 350-µm thick wafer. A multi-layer system of up to eight layers having alternating conducting layers (e.g. N-type doped poly-silicon) and isolating layers (e.g. silcon-oxide) are then grown until the vias are filled. The conducting and isolating layers are typically grown using a low pressure chemical vapor deposition process to achieve a high deposition uniformity. Subsequently, all layers on the wafer surface are removed in a chemical mechanical polishing process. In this way, a multi-connection, through-wafer structure can be fabricated.

Depending on the geometry and doping profile of the isolation layers, a connection resistance of less than 80 Ohms can be achieved with sufficient DC isolation.

The sensor fabrication process begins (FIG. 2A) with High-Aspect Ratio Silicon (HARS) tips 220, which are shaped from silicon tip features by combining isotropic etching with an anisotropic Deep-RIE-silicon etch process. The process of fabricating HARS tips from about 2 to about 4 micrometer diameter features is described in R. Fasching, Y. Tao, K. Hammerick, F. Prinz, "A Pencil Probe System for Electrochemical Analysis and Modification in Nanometer Dimension", Proc. SPIE 5116, Smart Sensors, Actuators, and MEMS-Microtechnologies for the New Millenium 2003, Spain, 2003, 128-135. In an alternative embodiment, about 1 µm silicon tip features are uniformly patterned using proximity mode exposure photolithography. A series of optimized thermal oxidation processes are then performed to give a uniform tip array with tip diameters of about 200 nm and tip top radii less than about 20 nm. For example, with a lithographical pattern size of 1.5 µm. a six hour high temperature oxidation process at 950° C. is used to achieve sharp HARS tips. Both embodiments allow HARS tips to be patterned with a distance of less than about 10 µm between tips.

The HARS tips 220 are then typically coated with a wet oxidation step to form an oxide layer 230 with a thickness of smaller than about 100 nm. The oxide serves as protection of the silicon tip during a subsequent silicon nitride etch step. Next, a low-stress silicon nitride layer 240, the main layer of the cantilever structure, is deposited using Low Pressure Chemical Vapor Deposition (LPCVD) with a typical thickness of about 500 nm (FIG. 2B). Next, a highly non-uniform coating of photo resist 250 is applied (FIG. 2C). This non-uniformity can be achieved due to the high-aspect ratio tip structure. A nominal thickness is formed up to the tip structures, whereas on the top part of the tip only a highly thinned resist layer is left. In order to achieve such coating behavior, a resist with a nominal thickness smaller than the height of the tip has to be applied. Due to the typical height of the tips of about 10 µm to about 20 µm, a photo resist with a nominal thickness of about 1.6 µm is typically used (e.g. 3612, Shipley, 2 krpm/min). Using an isotropic $SF_6$ based plasma etch process, the thin photo resist on the top part of the tip is then removed and the silicon nitride is etched (FIG. 2D). Typical parameters of this process are a flow ratio of $SF_6$/Freon 14 ($CF_3BR$) of about 300 sccm/0.5 sccm, a process pressure of about 200 mtorr, and a power density of about 0.5 W/cm². An etch selectivity between silicon-nitride and silicon-oxide of higher than about 4 can be so achieved, which is required to secure a reliable protection of the silicon tip. The release of the remaining oxide layer is typically carried out using Buffer Oxide Enchant (BOE 20:1) with a typical etch rate of about 30 nm/min. This results in sharpened and thinned silicon tips protruding from the silicon nitride layer. The silicon nitride layer may be further etched at this point to give an eventual cantilever thickness of about 300 nm.

The next fabrication step, shown in FIG. 2E, is to pattern metal electrodes and bonding structures that allow individual connections to each single tip electrode. Lift-off technique is typically applied using, e.g., LOL 2000 resist (Shipley, Mass.) in combination with a conventional positive resist, such as SPR 220-7 (Shipley, Mass.), with a nominal thickness of about 7 μm (3.5 krpm/min). A magnetron sputter process is used to deposit a metal, metal alloy, or metal polymer composite layer system 260. In a preferred embodiment, an about 5 nm-thick chromium- and about 50 nm-thick platinum layer is used in order to achieve good wall coverage and adhesion. Chromium promotes the adhesion of a platinum layer, which may serve as a catalytic material for an electrochemical UME (Ultra Micro Electrode) on the HARS tip. In an alternative embodiment, chromium and silver/silver chloride are used in the metal layer system. Next, as shown in FIG. 2F the entire electrode tip structure is covered with a Plasma Enhanced Chemical Vapor Deposition (PECVD) silicon nitride layer 270 with a thickness of about 100 nm. The deposition is typically carried out at about 350° C. using a mixed frequency process (e.g. STS, UK). This process allows deposition of tensile or compressive stressed silicon nitride. The PECVD silicon nitride layer is used to adjust and control the resulting stress and, therefore, bending of the cantilevers.

The final steps of the fabrication process are illustrated in FIG. 3, with silicon wafer 310, HARS tip 320, silicon oxide layer 330, silicon nitride layer 340, electrode layer 360 and PECVD nitride layer 370 identified in FIG. 3A. In a step illustrated in FIG. 3A, cantilevers are patterned 380 into the silicon nitride 340 and silicon oxide 330 layer system. This is typically carried out lithographically in combination with a dry-etch step. An important consideration of the dry etch step is the achievement of a sufficient protection of the embedded HARS-tip against applied $SF_6$ Therefore, a photo resist, such as SPR 220-7 (Shipley, Mass.) is coated twice to achieve a desired thickness of about 15 μm (coated twice, 2 krpm). Etching is typically done using a plasma process with a flow ratio $SF_6$/Freon 14 ($CF_3BR$) of about 50 sccm/33 sccm, a process pressure of about 150 mtorr, and a power density of about 0.5 $W/cm_2$. Etch rates of silicon nitride of about 70 nm/min and about 25 nm/min of oxide are typical. Bonding pad openings are created using the same process used for cantilever shaping with the following exception: only the isolation layer on top of the layer system is removed to expose the platinum surface. The platinum is not attacked by the etch chemistry and serves as an etch stop.

One of the crucial steps in probe fabrication is the creation of UME electrodes on top of the embedded HARS structures while exposing the sharpened tip. This is typically done utilizing FIB technology to create an etch mask for a standard silicon nitride plasma etch step, as shown in FIG. 3B. In one embodiment, a chromium and gold metal layer is used as a mask material system because of its chemical stability against $SF_6$ based plasmas. The metals are typically magnetron sputtered on the wafer with a thickness of about 5 nm Cr and about 100 nm Au to achieve good coverage of the tip structure. Openings in sub-micron size are cut in the metal layer on top of the tip structures using a focused gallium ion beam 390 with ion energy of about 30 keV. This task is carried out with a Dual Beam Machine (FEI, US), which allows processing of four-inch wafers using ion- and electron beams in the same process chamber. After patterning of the metal mask, the wafers are exposed to the above described plasma etch process to remove the PECVD silicon nitride until the platinum is reached in order to create a UME 392 on top of the tip. As mentioned above, the platinum layer is used as an etch stop and protects the silicon tip from being etched. In an alternative embodiment, the UME is formed as part of a batch process, using conventional plasma etching techniques.

After the UME 392 is formed, the silicon nitride layer is patterned on the backside for a wet etching step (typically KOH 40%, 70° C.) in order to release sensors 394 (FIG. 3C). During this wet etch step, the front side is protected by the metal mask and a layer of black wax (e.g. Apiezone Wax Type W, M&I materials LTd. UK). Finally, the wax is removed in a prianha solution (concentrated $H_2SO_4$: 30% $H_2O_2$, 3:1 at 120° C.). Gold and chromium are removed using standard gold and chromium etch solutions (e.g. Gold Etchant TFA, Transene Inc., MA, and CR-7 Chromium Photomask Enchant, Cynatec Corporation, CA). The masks of the backside etch step are designed so that the sensor 394 remains physically connected to wafer 310 by means of thinned silicon bridge structures. Breaking of these structures allows a simple and reliable release of single sensors.

Electrical Interfacing Of Sensors

The size of the silicon wafer cutout with the sensor is about two by three mm and is impractical for direct manipulation. Therefore, in one embodiment, the silicon-based sensor is attached to a commercially-made printed circuit board (PCB), such as those typically used with a commercial AFM microscope. In an alternative embodiment, the sensor is attached to a custom-made printed circuit board (PCB).

Bonding wires facilitate electrical connections between the custom-made PCB and the silicon sensor. After bonding, the bonding wires and pads on both the custom-made PCB as well as the sensor are potted with an adhesive. The purpose of the adhesive is to mechanically protect the bonding wires and at the same time avoid current flow between bonding wires when the bonding area is immersed in an electrolyte. The custom-made PCB, besides serving as a substrate for handling the silicon sensor, also accommodates input voltage buffers with active guarding. Typically, an electrical signal from the sensor is first routed to voltage buffers and then to an output connector.

Figure 4:
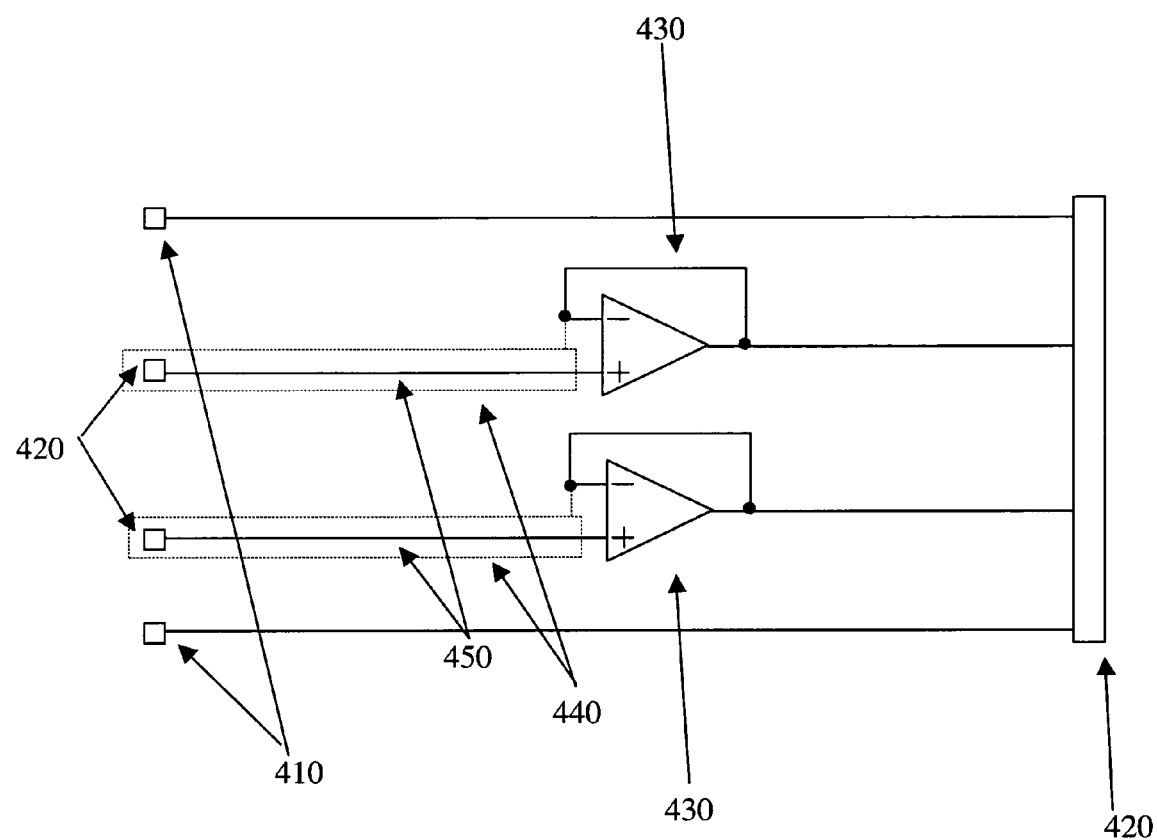
FIG. 4 shows a simplified schematic of a preamplifier board according to the present invention.

A simplified schematic of the preamplifier circuit with active guarding is shown in FIG. 4. The circuit acts as an interconnect between the silicon sensor and outside instrumentation. It provides a direct connection between two bonding pads 410 and a connector 420 and two buffered connections between bonding pads 412 and the connector 420. This configuration allows multipurpose use of the probe (potentiostatic/galvanostaic measurements) in four-wire mode. The PCB board also accommodates positive and negative low-noise voltage regulators, not shown in FIG. 4.

Voltage buffers 430 serve several purposes: reduction of the signal path length with high source impedance, reduction of microelectrode loading, and active guard driver. The voltage buffers may be formed by a single electrometer-grade opamp, such as OPA129 (Texas Instruments, Inc.) in a unity amplifier configuration. In a preferred embodiment, the selected amplifier has a common mode impedance of about $10^{15}$ ω in parallel with about 2 pF, input bias current smaller than about 100 fA, and input offset voltage smaller than about 2 mV. The input impedance is well above the expected 1 Gω kinetic resistance of the UME, thus eliminating measurement distortions due to loading. The input bias current directly loads the electrode, hence a small bias current is crucial to undistorted electrode measurement.

The active guard concept is a powerful technique that can significantly reduce capacitance and increase resistance between the shielded line and the ambient environment. The voltage buffer 430 in the designed preamplifier board drives guard traces 440, located around buffered signal lines 450 and a copper plane below the buffered traces (not shown), at the same potential as the signal lines, but with a smaller source impedance. Since there is (in the ideal case) no potential difference between the guard and the signal trace, no current can flow between the signal line 450 and guard 440. In addition to the active guarding, the preamplifier circuit may be further shielded by a Faraday cage to help eliminate interference and noise.

Sensor System

Figure 5:
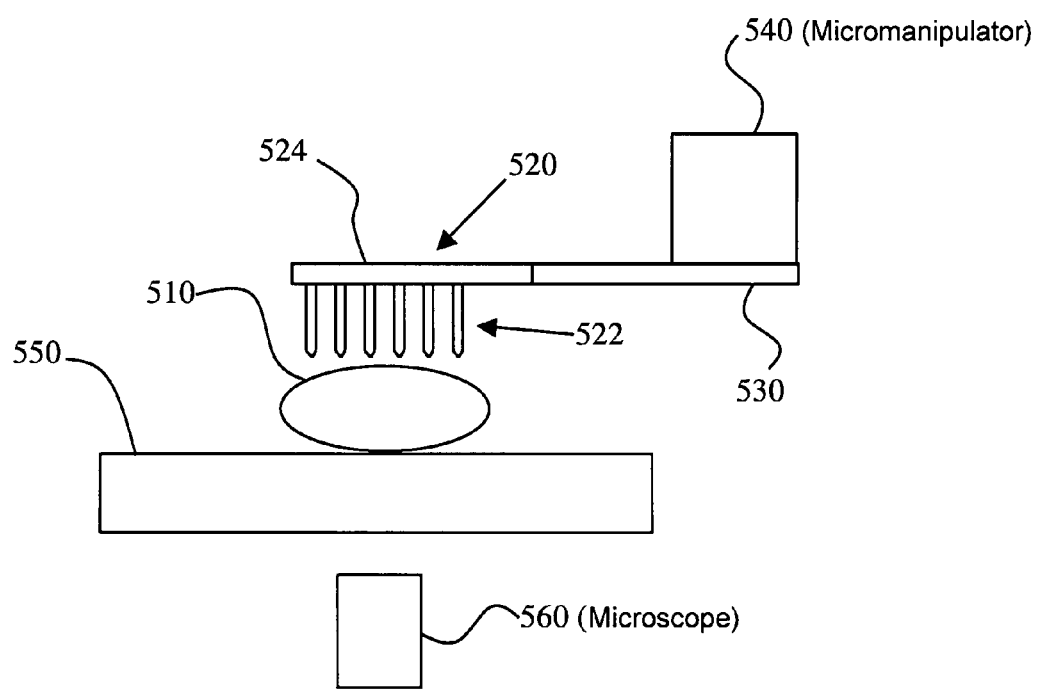
FIG. 5 shows a system for electrical, electrochemical or topographical analysis according to the present invention.

In one embodiment of the invention, the described sensors are used in a system (FIG. 5) for electrical, electrochemical and topographical analysis of a sample 510. The system includes a sensor 520 having probes 522 attached to a cantilever 524. Sensor 520 is electrically interfaced with a signal processing chip 530, having signal amplifiers, for processing data collected by sensor 520, e.g. using the preamplifier circuit described above. Signal processing chip 530 is in turn connected to a micromanipulator 540 for bringing sensor 520 in close proximity to, in contact with, or within sample 510. Any micromanipulator could be used for this invention, including but not limited to those used in standard AFM. Sample 510 is immobilized and supported on stage 550. Sample 510 may be, for example, a biological cell, biological tissue, or any other electrochemical system. In a preferred embodiment, stage 550 is optically transparent. The system also includes a microscope 560 for optical visualization of the sensor 520 and the sample 510. Any microscope could be used for this invention, including but not limited to an inverted fluorescence confocal microscope.

In order to individually penetrate cells, they have to be immobilized in a stable fashion. Keeping the cell as stable as possible is important for accurately measuring individual cell electrical signals as well as scanning cell topology. Several approaches may be used to immobilize individual cells in aqueous environments, which are described as follows.

1. Patch Clamping

The patch clamp technique is an electrophysiological method that is used to record specific ion channel currents or whole cell currents flowing across the biological membrane depending on the configuration. The basic concept is to use a glass pipette with a very small opening (several micrometers in diameter) to make tight contact with a very small area on a cell membrane. A pressure gradient keeps the contact tight throughout the recording period. The patch clamp technique has the advantages of precise manipulation, stability, and minimal cell damage. This technique can be reliably used to immobilize cells, including mammalian cells and plant cells, ranging from about 5 µm to about 20 µm in diameter.

2. Planar Patch Clamping

Planar patch clamping represents a significant improvement over the conventional patch clamp technique. Planar patch clamp devices replace the pipette with "planar" patch-clamp electrodes, in which a micrometer-sized hole is made in a suitable, thin insulating partition. These devices can be used to trap and immobilize single cells on a planar surface. A variety of fabrication schemas for a device such as this are reported in the literature, and simple types of planar patch clamp chips are commercially available. Most of these devices are made of silicon, which is opaque, and cannot be combined with optical microscopy.

To respond to system needs of cell immobilization and concurrent manipulation of sensors during optical visualization, we have developed a special patch clamp device. This device includes two micro-machined parts that are bonded together, one above the other, with an adhesive. The top part is a silicon chip with a transparent silicon nitride window. This window includes one or more sub-micron-sized patch clamp holes, which are typically fabricated using a Focused Ion Beam (FIB) technique. To improve the optical localization of the one or more holes, a platinum arrow may be deposited using an FIB deposition technique. The bottom portion is a micro fabricated glass chip with ports for fluidic connections and electrodes.

3. Hydrogel Embedding of Cells

Hydrogels may be used as another method of immobilization. These materials can trap cells between long chain molecules. A stronger immobilization can be achieved by cross-linking the hydrogel molecules. The advantage of using hydrogels over the patch clamp methods is that the hydrogel can hold cells at the surface of the sample substrate and restrict the cells in the plane of the hydrogel, with the substrate creating an additional restricted direction of motion, without the requirement of fabrication techniques beyond spin coating the hydrogel onto a substrate. A challenge of using the hydrogels is that they must be strong enough to hold cells in place during penetration, but soft enough for a tip probe to penetrate the gel.

Two gels suitable for practicing the invention are alginate and agarose. The alginate cross-links in the presence of $Ca2+$ ions in solution. Agarose becomes a highly viscous gel below a characteristic gelling temperature. In a preferred embodiment, the agarose gels between about 24° C. and about 28° C. for 1.5 wt % gels.

Two methods for sample preparation suitable for practicing the invention are as follows. The first method involves mixing cells into the hydrogel during gel preparation. In the case of the agarose, gelling temperature must be below about 37° C. The solution of hydrogel and cells is then applied to a glass substrate via spin coating. In the second method, the hydrogel is prepared without cells. After spin coating hydrogel onto the substrate, a suspension containing cells is spun onto the hydrogel. By spinning the gels, hydrogel films approximately 10 mm thick with cells embedded can be produced.

EXAMPLES

Electrochemical response of the sensor

Cyclic voltammetry was applied to investigate the electrochemical behavior of the sensors. Sodium hydrogenphosphate (99%) and dihydrogenphosphate, potassium chloride (99%, a.c.s. reagent), hexammineruhtenium(III)chloride (99%), silver wire (0.5 mm diameter, 99.9%) and platinum wire (0.5 mm diameter, 99.99%) were all purchased from Sigma Aldrich and used as received. All solutions were prepared with deionized water (HPLC reagent) supplied from J. T. Baker. Electrochemical measurements were carried out using a Solatron 1287, an electrochemical interface, in combination with a Solatron 1260, Impedance/Gain Phase Analyzer (Solatron Analytical, UK). A three-electrode arrangement was employed. The sensor was mounted on a micromanipulator stage PCS-6000 (Burleigh Instruments, NY) This way, the probes on the cantilever could be immersed in a drop or film of electrolyte in a controlled fashion. A Pt thin film layer was used as a substrate and counter electrode and an Ag/AgCl wire electrode was used as a reference electrode. The Ag/AgCl electrode was fabricated by chemically modifying a silver wire with a 3% (by weight) ion(III)chloride, 3% hydrochloride solution. Measurements were started immediately after placing the electrolyte drop on the substrate. The measurement duration did not exceed 5 minutes in order to avoid significant changes of the electrolyte concentration due to evaporation.

In one experiment, cyclic voltammograms of both a sensor with a platinum UME and a platinum-wire electrode were carried out. In these experiments, phosphate buffer was used as an electrolyte solution. The sensor showed all the same electrochemical surface reactions as the platinum-wire electrode.

Figure 6:
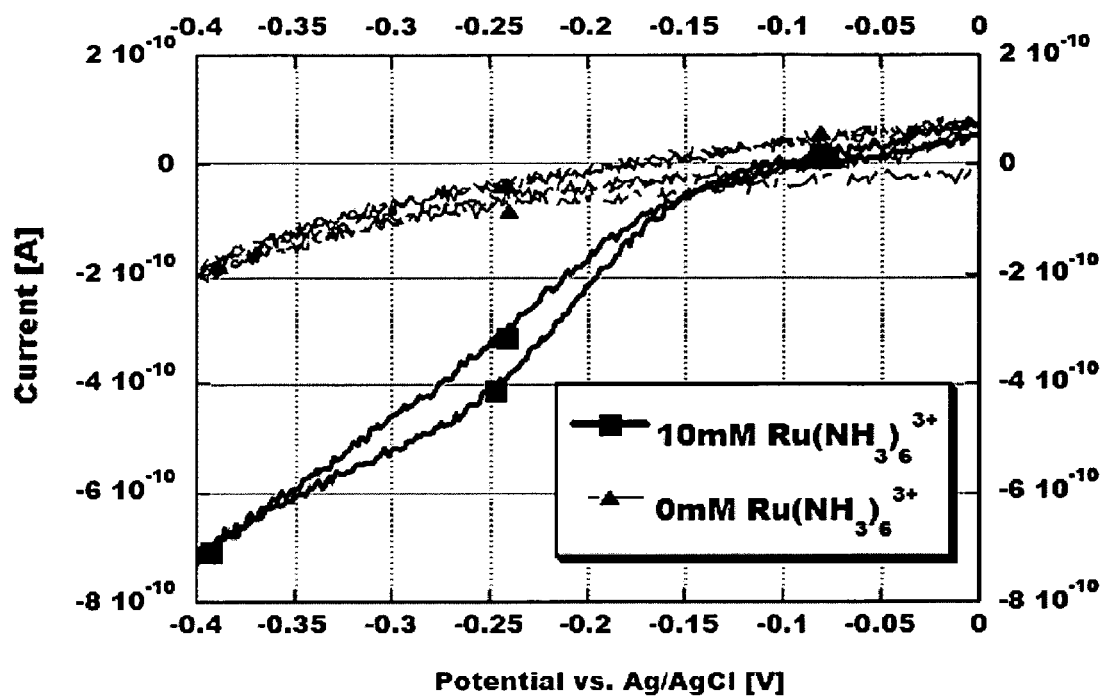
FIG. 6 shows a cyclic voltammogram of a sensor according to the present invention in 0.1M phosphate buffer electrolyte with 10 mmol and 0 mmol concentration of $Ru(NH_3)_6^{3+}$.

In another experiment, Hexammineruhtenium(III)chloride was used to study the response of a sensor to a reversible redox-system. In FIG. 6, cyclic voltammograms, taken in an 0.1M phosphate buffer electrolyte solution with 10 mmol and 0 mmol concentration of $Ru(NH_3)_6^{3+}$, are shown. Sensors with an electrode area of 0.125 $\mu m^2$ were tested. The x-axis shows potential (in volts) with respect to an Ag/AgCl electrode and the y-axis shows current (in amps). A reduction current appears in the potential range below −200 mV with respect to a 0.1 mol KCl Ag/AgCl reference electrode. Electrochemical Impedance Spectroscopy (EIS) analyses measured a faradic impedance of the sensor of $50 \times 10^7$ Ohm at a DC working potential of −300 mV for 10 mM $Ru(NH_3)_{63+}$. Both the behavior of the reduction current and values of the faradic impedance in a $Ru(NH3)_{63+}$ redox system show typical characteristics of a single UME of sub-micron size and indicate the electrochemical functionality of the sensor.

Mechanical response of the sensor

Mechanical characterization of the sensors and AFM scans were carried out using a PicoPlus AFM system with a long-range (100 μm) scanner (Molecular Imaging, AZ). For the mechanical investigations of the sensor, single probe cantilever sensors were used. The thickness of the silicon nitride cantilevers was 0.4 μm. The cantilever length was 100 μm and the width was 60 μm. The height of the probe was 15 μm and the body diameter of the probe was 0.7 μm. The spring constant for this sensor was 0.3 N/m. By varying the length and the width of the cantilever the spring constant can be adjusted from 1N/m to 0.001N/m using the same fabrication processes.

Figure 7:
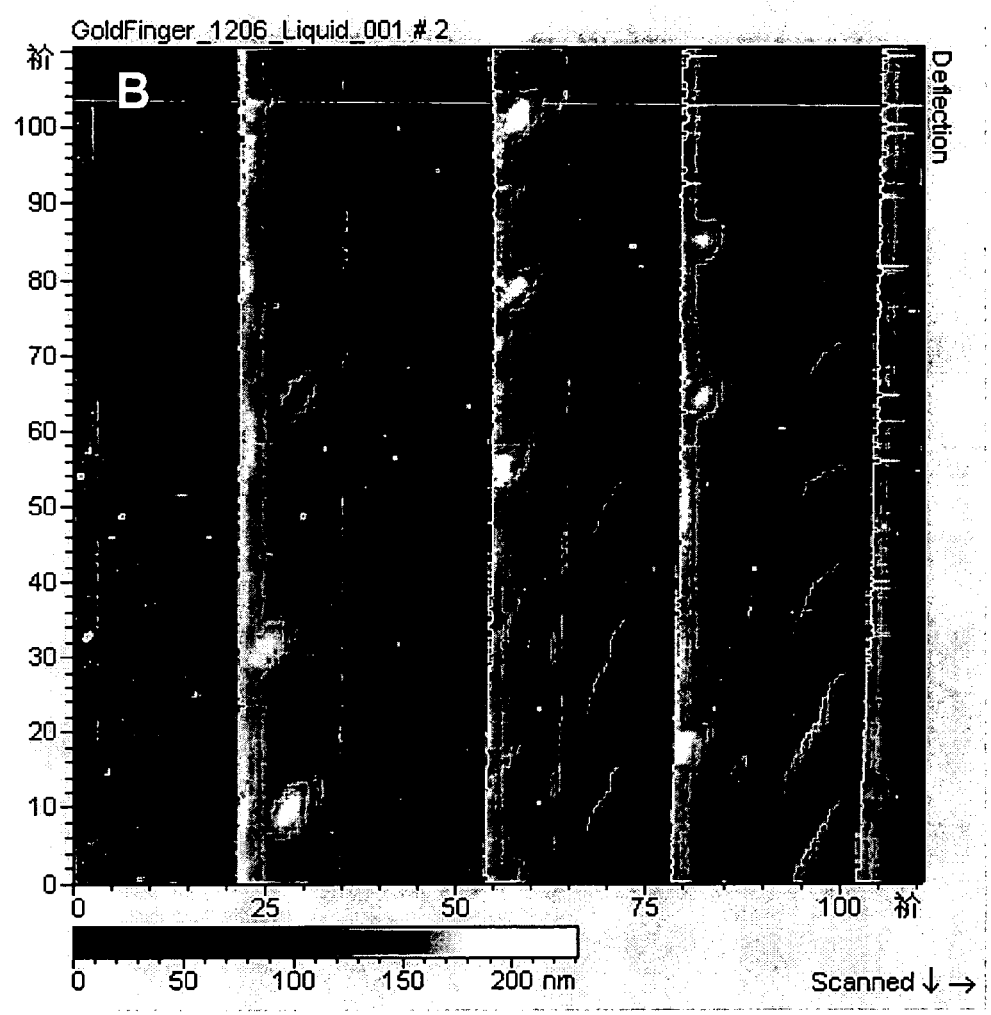
FIG. 7 shows an Atomic Force Microscopy picture of a metal stripe structure using a sensor according to the present invention.

The measured resonance frequency of the sensor in air was 108.1 kHz with a Q number of 72. This compares well with a theoretical resonance frequency of 100 kHz for this sensor. The mechanical stability of the probe was tested by scanning patterned surfaces with sharp steps at high scanning speeds. In FIG. 7, a deflected AFM image of a sample substrate with gold stripes is shown. The sensor was operated in tapping mode. The image shows high resolution and stability. In addition, none of the tested tips was damaged from scanning, demonstrating the mechanical robustness of the sensors.

Testing of preamplifier circuit

The preamplifier circuit described above was tested for electrical properties. Typically, an exponential decay in measured current was observed. In general, it took several minutes for the measured current to stabilize. The experiments suggest that a space charge relaxation occurs within the PCB, characterized by a charging time constant of several minutes. The measured impedance between the guard ring and the signal line was between $10^{13}$ and $10^{14}$ ω. Consequently, a 2 mV offset between the guard and the signal line will cause current smaller than 1 fA, which is satisfactory. Once the clean board was characterized, a drop of potting adhesive was placed on top of the bonding pads. No measurable impact on the impedance between pads covered by the adhesive was observed.

A set of DC measurements was performed with the preamplifier PCB to investigate the parasitic impedance of the PCB substrate as well as of the bonding adhesive. The boards were cleaned with acetone, isopropanol, and deionized water followed by a 30 minute bake at 80 C. During the experiment the investigated electrodes were biased with 5 V and the resulting current was measured with a current amplifier (Keithley 486, Keithley). The preamplifier was then tested with a set of potentiostatic electrochemical measurements. The experimental setup consisted of a silver/silver chloride coated sensor with a 10 $\mu m^2$ active area and a reference electrode in a potassium chloride solution. The concentration of chloride in the solution was gradually increased and the potential between the UME and the reference electrode was recorded with a multimeter. The measured potential at the UME followed the potential predicted by the Nernst equation at chloride concentrations above 100 mM. Below this concentration, the measured potential was smaller, most probably due to the loading of the equilibrium at the UME by parasitic currents.

Cell Membrane potential measurement

A cell membrane potential, which can be measured with an electrode couple and a voltmeter, is a voltage drop across a cell membrane. To measure the membrane potential of a rat fibroblast cell in culture with a sensor according to the present invention, the sensor and a bulk electrode were immersed in the cell culture medium using a manipulator for precise and stable control. The bulk Ag/AgCl electrode was placed outside of the cell (reference electrode). The sensor probe, with the UME, was inserted into the cell (working electrode) using a piezo-actuator while the cell was being held by a glass pipette. The UME used for this experiment had silver as the metal layer and had a high exchange current, which lowers the electrochemical electrode impedance. A confocal inverted microscope was used to visualize and position the cell and the probe during the penetration. The probe could be tightly sealed with the cell membrane to minimize current leakage because both the cell lipid bilayer and the probe surface, which is covered in silicon nitride, are hydrophobic. The penetration test was conducted in an aqueous environment (Dulbecco's modified eagle medium with L-glutamine, 110 mg/L sodium pyruvate, and pyridoxine hydrochloride) to keep the cell alive during the experiment. The data were collected with an electrochemical impedance analyzer (Solartron analytical, UK).

Figure 8:
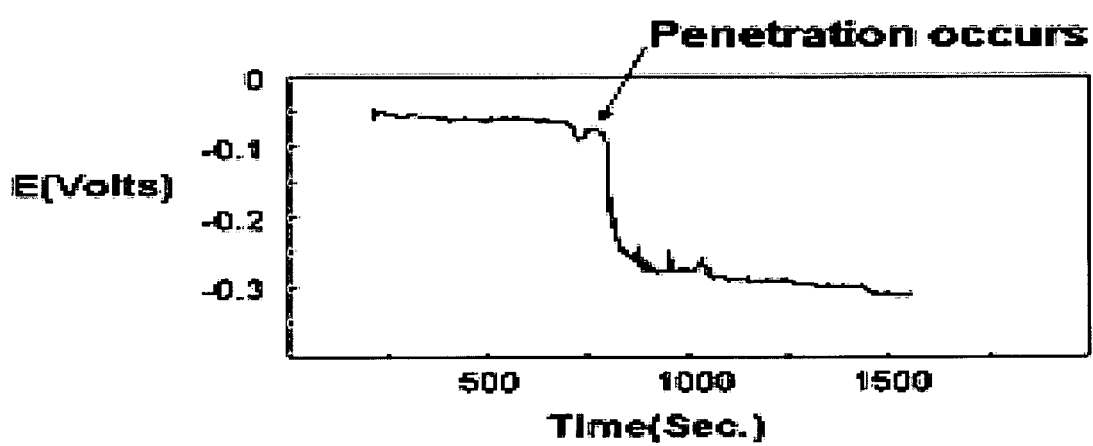
FIG. 8 shows open circuit voltage during and after penetration of an animal cell by a probe according to the present invention.

The potential data were recorded during a period of more than 10 minutes. Initially, both working and reference electrodes were in the medium and outside the cell. As the working electrode was inserted into the cell, a voltage decrease was recorded and the voltage drop was permanent as long as the working electrode remained inside the cell. FIG. 8 shows the open circuit voltage drop during cell penetration and the constant voltage data after penetration. (The x-axis is time in seconds, the y-axis is voltage in volts, and the time of penetration is marked on the graph). This constancy of the voltage drop after penetration represents a tight sealing of the cell plasma membrane around the probe.

To calculate the electrochemical properties of the cell membrane, an equivalent circuit analogous to a simple electrical circuit was constructed. The equivalent circuit was modeled as a parallel combination of resistances, capacitances, and electrochemical components, such as faradic and non-faradic components. There are three main electrical components in the equivalent circuit. The first impedance is a small resistance through the cell medium. Since there is a large concentration of supporting ions in the medium, the resistance of the solution is on the order of a few hundred ohms. The second component is a capacitance through the silicon nitride layer of the probe and the epoxy covered bonding wires. This capacitance could be avoided if the penetration test was conducted in non-aqueous environment. The last part in the equivalent circuit is faradic/non-faradic component. In front of a UME and a reference electrode, kinetics of a heterogeneous charge transfer reaction limit electron flow and cause charge transfer resistance, which is a faradic component. In addition to the faradic component, non-faradic processes exist due to the double sheet capacitance and mass transfer limitations of the reactants. This mass transfer limit in an electrochemical system is called the Warburg impedance.

Based on impedance data acquired before penetrating the rat fibroblast, values for each component were calculated using a fitting program (zView, Solartron). After penetrating a fibroblast, the equivalent circuit slightly changes due to the capacitance and resistance of the cell membrane from ion channels and the lipid bilayer of the cell membrane. The resistance and capacitance is in series with the faradic/non-faradic components of the probe in the equivalent circuit. The specific capacitance of normal cell membranes is near 1.0 $\mu F/cm^2$, slightly higher than that of a pure lipid bilayer, 0.8 $\mu LF/cm^2$. The specific resistance of the cell membrane varies from 10 to 106 $\Omega cm^2$ depending on the number of open ion channels.

To calculate the values of the resistance and capacitance of the cell membrane, we used the same fitting program assuming that the values of the electrical components of the equivalent circuit are fixed during the cell penetration. The calculated resistance and capacitance values from the cell were 2.8 $M\Omega$ and 97 pF, respectively. The resistance value is reasonable for the cell membrane. However, the capacitance value of the membrane differs from theoretical values. This is because the capacitance of the silicon nitride dominates that of the cell membrane.

Cell membrane impedance measurement

Figure 9:
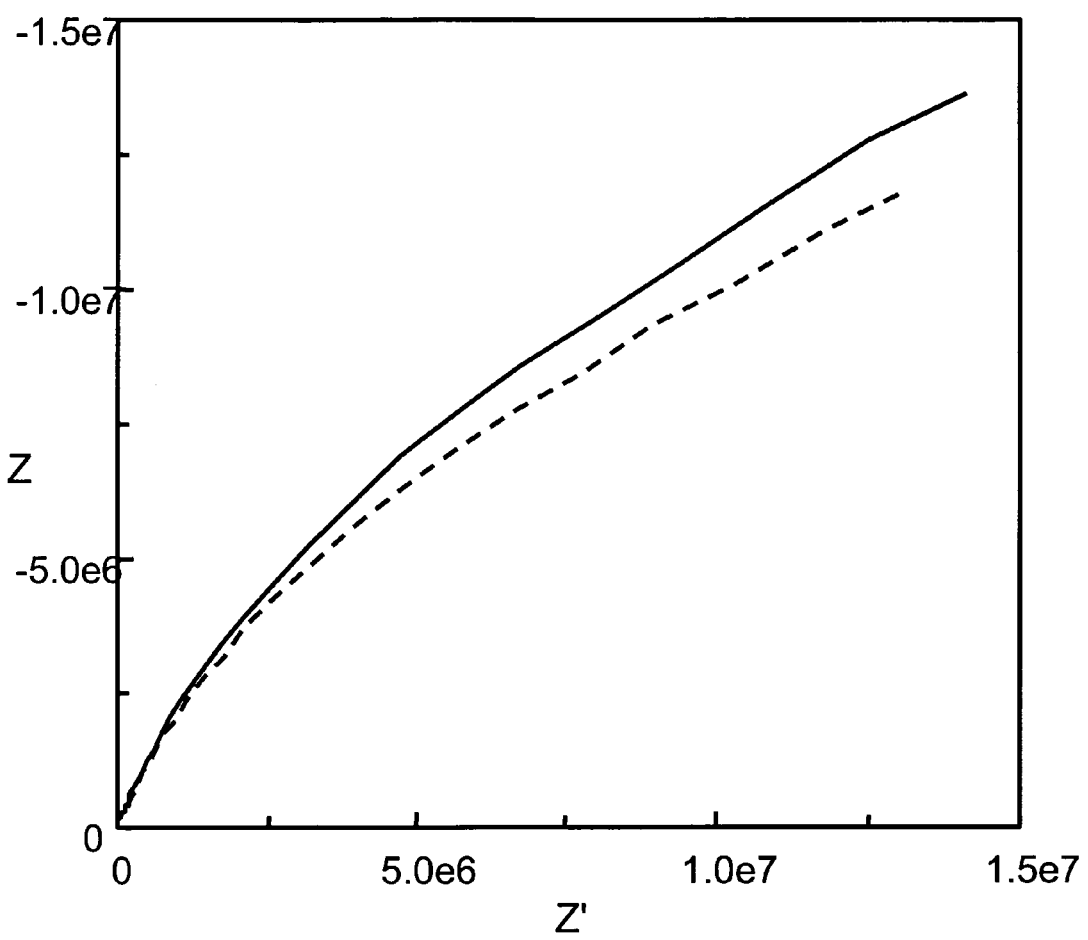
FIG. 9 is a Nyquist plot showing a change in cell impedance after penetration of an animal cell by a probe according to the present invention.

With a similar experimental configuration to that used for cell membrane potential measurement, we have been able to measure impedance of the cell membrane. Again, we used silver as the electrode metal to take advantage of its high exchange current, so the intrinsic impedance of the probe itself was relatively low. The membrane impedance is the difference between the impedance measured when both electrodes are outside the cell and the impedance after the working electrode is inserted into the cell. FIG. 9 is a Nyquist plot showing the change of impedance after cell penetration. The dashed line was obtained before the penetration, and the solid line was obtained after the penetration. The difference of the impedance represents the cell membrane impedance.

Atomic force microscopic imaging of cells

The sensor we have developed has the capability of high-resolution imaging of biological cells. For this experiment, we used a sensor with a single probe and we coated the cantilever with metal to gain laser reflectivity. We then used the probe to image chlamydonomas reinhardtii cells. To immobilize the cells, a thin layer of hydrogel was spun on the substrate followed by cell embedding. This caused the bottom side of the cell to be embedded in the gel for more stable positioning while the upper portion of the cell was exposed for AFM scanning. The high-aspect-ratio probes we developed were able to scan the cell with topology heights over 2 µm.

Figure 10:
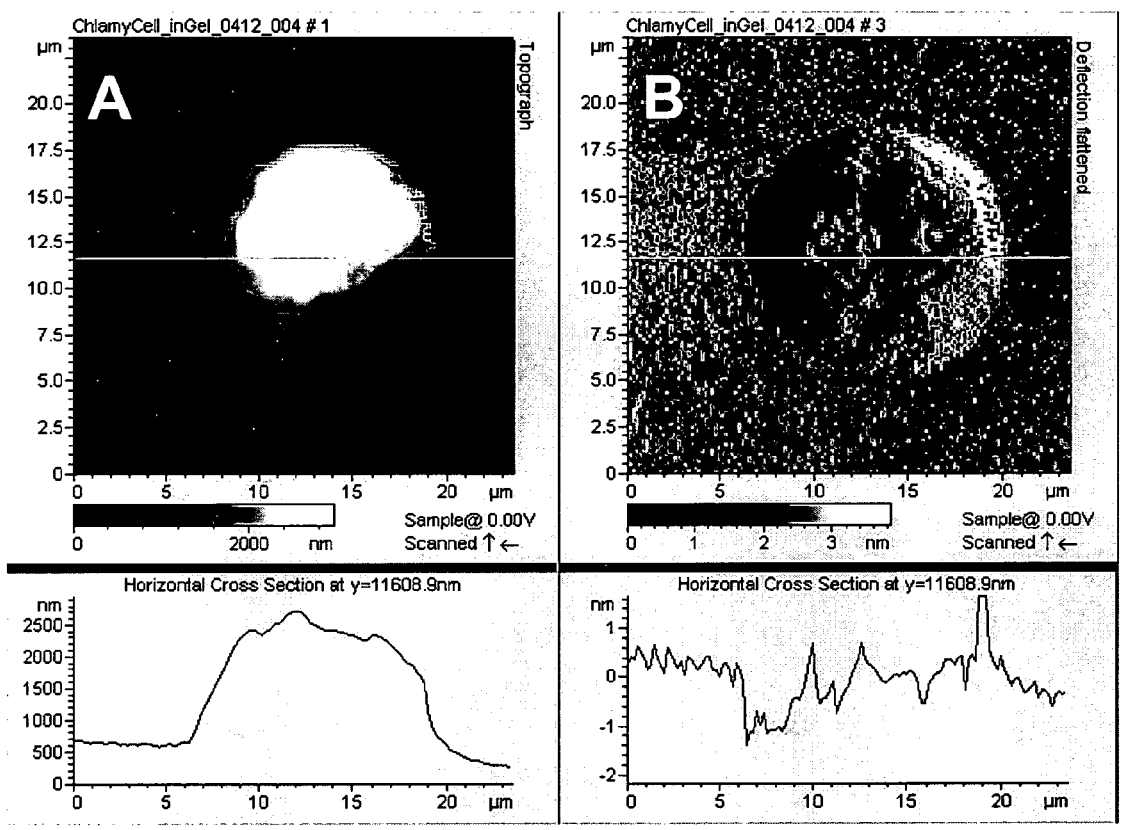
FIG. 10 shows a (A) topological and a (B) deflection image of a chlamydonomas reinhardtii cell imaged with Atomic Force Microscopy with a sensor according to the present invention.

FIG. 10 shows an AFM image of a chlamydonomas reinhardtii cell embedded in hydrogel.

FIG. 10A shows a topological image of a cell with a diameter of about 10 µm and height of about 2 µm. FIG. 10B shows a deflection image along the scanning profile; fine features on the cell membrane surface are able to be resolved.

Although the present invention and its advantages have been described in detail, it should be understood that various changes, substitutions, and alternations could be made herein without departing from the principles and the scopes of the invention. Accordingly, the scope of the present invention should be determined by the following claims and their legal equivalents.

What is claimed is:

1. A device for electrical, electrochemical or topographical analysis, comprising:
   a) a cantilever with a top and a bottom surface;
   b) one or more probes, wherein each of said probes has a tip end and a base end, wherein said tip end of said probe comprises an electrode, wherein said tip end of each of said probes has a radius of curvature of less than about 50 nm, and wherein a ratio of the distance between said tip end and said base end of said probe and the diameter of said base end of said probe is greater than about 19:1; and
   c) a holder for each of said probes, wherein said holder is positioned on the top surface of one end of said cantilever, wherein said holder has a bore to hold said base end of said probe, wherein said probe is situated inside said bore of said holder and is oriented with said tip end pointing away from said top surface of said cantilever, and wherein said holder extends from said top surface of said cantilever to less than the tip end of said probe.

2. The device as set forth in claim 1, wherein said cantilever has a thickness ranging from about 300 nm to about 500 nm.

3. The device as set forth in claim 1, wherein said one or more probes is about 2 to about 2000.

4. The device as set forth in claim 1, wherein said electrode of each of said one or more probes comprise a metal, a metal alloy, or a metal polymer composite system.

5. The device as set forth in claim 4, wherein said electrodes comprise chromium and platinum, or chromium and silver/silver chloride.

6. The device as set forth in claim 1, further comprising vias that connect from said top surface of said cantilever to said bottom surface of said cantilever.

7. The device as set forth in claim 1, wherein said one or more probes are separated on said cantilever by a distance of less than about 10 µm.

8. The device as set forth in claim 1, wherein said one or more probes is two or more, and wherein said cantilever has at least one longitudinal cut located between each pair of said probes.

9. A system for electrical, electrochemical or topographical analysis of a sample, comprising:
   a) a device, comprising:
      i) a cantilever with a top and a bottom surface;
      ii) one or more probes, wherein each of said probes has a tip end and a base end, wherein said tip end of said probe comprises an electrode wherein said tip end of each of said probes has a radius of curvature of less than about 50 nm, and wherein a ratio of the distance between said tip end and said base end of said probe and the diameter of said base end of said probe is greater than about 19:1; and iii) a holder for each of said probes, wherein said holder is positioned on the top surface of one end of said cantilever, wherein said holder has a bore to hold said base end of said probe, wherein said probe is situated inside said bore of said holder and is oriented with said tip end pointing away from said top surface of said cantilever, and wherein said holder extends from said top surface of said cantilever to less than the tip end of said probe;

b) a manipulator operably connected to said device for manipulating said device;

c) a signal processing chip including signal amplifiers, wherein said signal processing chip is electrically interfaced with said device for processing data collected by said device;

d) a stage having a surface for immobilizing and supporting said sample; and e) a microscope for optical visualization of said device and said sample.

10. The system as set forth in claim 9, wherein said stage is optically transparent and said microscope is an inverted fluorescence confocal microscope.

11. The system as set forth in claim 9, wherein said sample is a biological cell.

12. A method of electrically, electrochemically or topographically analyzing a sample using the system of claim 9, comprising:
   a) immobilizing said sample on said surface of said stage;
   b) visualizing said sample using said microscope;
   c) bringing said device in close proximity to, in contact with, or within said sample using said manipulator;
   d) collecting data from said sample with said device; and
   e) processing said data with said signal processing chip.

13. The method as set forth in claim 12, wherein said sample is a biological cell.

14. The method as set forth in claim 13, wherein said biological cell is immobilized using pipette or planar patch clamp techniques.

15. The method as set forth in claim 13, wherein said biological cell is immobilized using a hydrogel.

* * * * *